US012749726B2

(12) United States Patent
Davis

(10) Patent No.: US 12,749,726 B2
(45) Date of Patent: Sep. 29, 2026

(54) BATTERY PACK ASSEMBLY WITH A HEATER INTEGRATED VOLTAGE SENSE

(71) Applicant: Our Next Energy, Inc., Novi, MI (US)

(72) Inventor: Jason Davis, Livonia, MI (US)

(73) Assignee: Our Next Energy, Inc., Novi, MI (US)

( * ) Notice: Subject to any disclaimer, the term of this patent is extended or adjusted under 35 U.S.C. 154(b) by 839 days.

(21) Appl. No.: 17/958,274

(22) Filed: Sep. 30, 2022

(65) Prior Publication Data

US 2023/0108379 A1 Apr. 6, 2023

Related U.S. Application Data

(60) Provisional application No. 63/262,021, filed on Oct. 1, 2021.

(51) Int. Cl.

| | |
|---|---|
| ***H01M 10/48*** | (2006.01) |
| ***B60L 50/64*** | (2019.01) |
| ***B60L 58/27*** | (2019.01) |
| ***H01M 10/615*** | (2014.01) |
| ***H01M 10/625*** | (2014.01) |
| ***H01M 10/6551*** | (2014.01) |
| ***H01M 10/6571*** | (2014.01) |
| ***H01M 50/204*** | (2021.01) |
| ***H01M 50/249*** | (2021.01) |
| ***H01M 50/505*** | (2021.01) |

(52) U.S. Cl.

CPC ........... *H01M 10/482* (2013.01); *B60L 50/64* (2019.02); *B60L 58/27* (2019.02); *H01M 10/615* (2015.04); *H01M 10/625* (2015.04); *H01M 10/6551* (2015.04); *H01M 10/6571* (2015.04); *H01M 50/204* (2021.01); *H01M 50/249* (2021.01); *H01M 50/505* (2021.01); *H01M 2220/20* (2013.01)

(58) Field of Classification Search

CPC ............. H01M 10/482; H01M 10/615; H01M 10/625; H01M 10/6551; H01M 10/6571; H01M 50/249; H01M 50/505; H01M 50/204; H01M 2220/20; B60L 58/27; B60L 50/64

See application file for complete search history.

(56) References Cited

U.S. PATENT DOCUMENTS

| | | | | |
|---|---|---|---|---|
| 10,847,777 | B2 * | 11/2020 | DeKeuster ........ | H01M 10/0413 |
| 2012/0244404 | A1 * | 9/2012 | Obasih ................ | H01M 10/615 429/120 |
| 2014/0093755 | A1 * | 4/2014 | Houchin-Miller ...... | B60L 50/66 429/50 |

* cited by examiner

*Primary Examiner* — Raymond Alejandro

(74) *Attorney, Agent, or Firm* — Butzel Long

(57) ABSTRACT

A battery pack assembly that includes a heater integrated into a voltage sense circuit. The heater integrated voltage sense also includes a heat spreader that transfers thermal energy away from the heater. An array of cells is arranged on the base of the assembly and below the heater integrated voltage sense to allow the heater of the heater integrated voltage sense to be serviced without removing the cells.

17 Claims, 7 Drawing Sheets

BATTERY PACK ASSEMBLY WITH A HEATER INTEGRATED VOLTAGE SENSE

TECHNICAL FIELD

The present invention relates generally to a battery pack assembly having a heater integrated voltage sense. More particularly, the present invention relates to a battery pack assembly that integrates a battery heater into a single assembly with a voltage sense.

BACKGROUND

The power source of electric vehicles is primarily dependent on the power provided by its battery, so battery efficiency and endurance become key indicators of electric vehicle efficiency. For example, lithium-based batteries have the advantages of high efficiency and high endurance compared to conventional batteries (such as lead-acid batteries), and as such the battery systems of electric vehicles are typically lithium-based, though other options exist.

The battery systems serve as energy sources for electrical vehicles and for other energy-storage solutions. Battery systems are typically made from several components, including individual cells, temperature control elements, electrical current transmission systems, safety systems, etc. Batteries used in electric vehicles (EV) are used to power the electric motors of said electric vehicles. These batteries are usually rechargeable batteries, that are exposed to harsh operating environments including extreme temperatures.

For example, to prevent overheating of cells, EV batteries may have air-cooling or piped liquid cooling systems configured to provide battery thermal management by conducting heat away from cells. Further, since the overall performance of batteries may deteriorate at low temperatures and charging batteries at low temperatures poses a safety hazard, EV batteries may have heaters configured to heat the batteries in cold temperatures. Although there are conventional heating systems EV batteries, they still do not meet the needs of efficient heating, fast and safe cell charging and discharging, as well as the ability to service said heating systems when needed.

SUMMARY

The illustrative embodiments disclose a battery pack assembly having a heater integrated voltage sense. In an aspect herein, the battery pack assembly has a heater integrated voltage sense that includes a heater; a heat spreader that transfers thermal energy away from the heater; and a voltage sense circuit that is affixed to a first portion of the heat spreader, with the heater being affixed to a second portion of the heat spreader. The assembly also includes a plurality of cells arranged below the heater integrated voltage sense. The voltage sense circuit is electrically connected to the plurality of cells through one or more busbars and measures a terminal voltage of one or more cells of the plurality of cells. The heat spreader is thermally connected to the one or more cells of the plurality of cells through said one or more busbars or through contact with a top portion of the one or more cells.

In another aspect, the heat spreader is a graphite heat spreader. In some implementations, the voltage sense circuit and the heater are on a same side of the heat spreader while in other implementations, the voltage sense circuit and the heater are on opposite sides of the heat spreader.

Further, the voltage sense circuit may be a flexible circuit. The heater may also be flexible circuit heater. In some implementations, the voltage sense circuit includes one or more thermistors. The battery pack assembly may include a thermal barrier disposed on a top of the heater to substantially reduce heat loss to ambient air. The heat spreader may include a plurality of holes configured to provide clearance for affixing the voltage sense circuit to the busbars or to provide cell vent clearance.

In yet another aspect, the battery pack assembly has a cell-to-pack configuration. In the cell-to-pack configuration, battery cells are arranged directly inside sidewalls without the use of separate battery modules to house the cells. Further, the heater is mounted in a location of the battery pack assembly that allows the heater to be serviced without a need to remove any cell of the plurality of cells. The heater integrated voltage sense is configured to dissipate thermal energy away from the one or more busbars during charging or discharging of the plurality of cells. The heater integrated voltage sense is further designed to heat the plurality of cells evenly or substantially evenly.

In some implementations, the heater is removably affixed to the heat spreader. This may be may achieved, for example, by gluing or adhering the heater to the heat spreader. Further, the heater is replaceable with another heater separately from the heat spreader. The heater integrated voltage sense may include a plurality of heaters. The heater may be made from a material selected from the group may include of copper, aluminum, copper-nickel, and nickel chromium.

Yet another aspect is related to a battery pack assembly that includes a heater integrated voltage sense with the heater integrated voltage sense having a heater and a voltage sense circuit. The assembly also includes a plurality of cells arranged in the battery pack assembly below the heater integrated voltage sense. The voltage sense circuit is electrically connected to the plurality of cells through one or more busbars, and configured to measure a terminal voltage of one or more cells of the plurality of cells and the heater is thermally connected to the one or more cells of the plurality of cells. Further, the heater and the voltage sense circuit are disposed on a base insulating material.

Implementations of the disclosure may include the hardware as well a method or process of manufacturing or assembling the battery pack in the configuration described herein. Further, computer software on a computer-accessible medium of a battery management system are contemplated for generating instructions for thermal management of the battery pack based on measured temperatures and/or voltages received from the heater integrated voltage sense. For example, in one aspect, a method includes providing a heater integrated voltage sense having a heater, a heat spreader and a voltage sense circuit, disposed in close proximity to a top portion of a plurality of cells in a battery pack assembly. The method includes obtaining at least one temperature measurement from at least one temperature sensor integrated into the heater integrated voltage sense and activating, responsive to said obtaining, a heater of the heater integrated voltage sense to heat the top of the plurality of cells through corresponding cell-integrated busbars such that the heat spreader substantially evens out temperatures on the corresponding cell-integrated busbars, during heating, to provide even heating to the plurality of cells, and during cycling, to dissipate heat from said cell-integrated busbars.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

To easily identify the discussion of any particular element or act, the most significant digit or digits in a reference number refer to the figure number in which that element is first introduced. Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
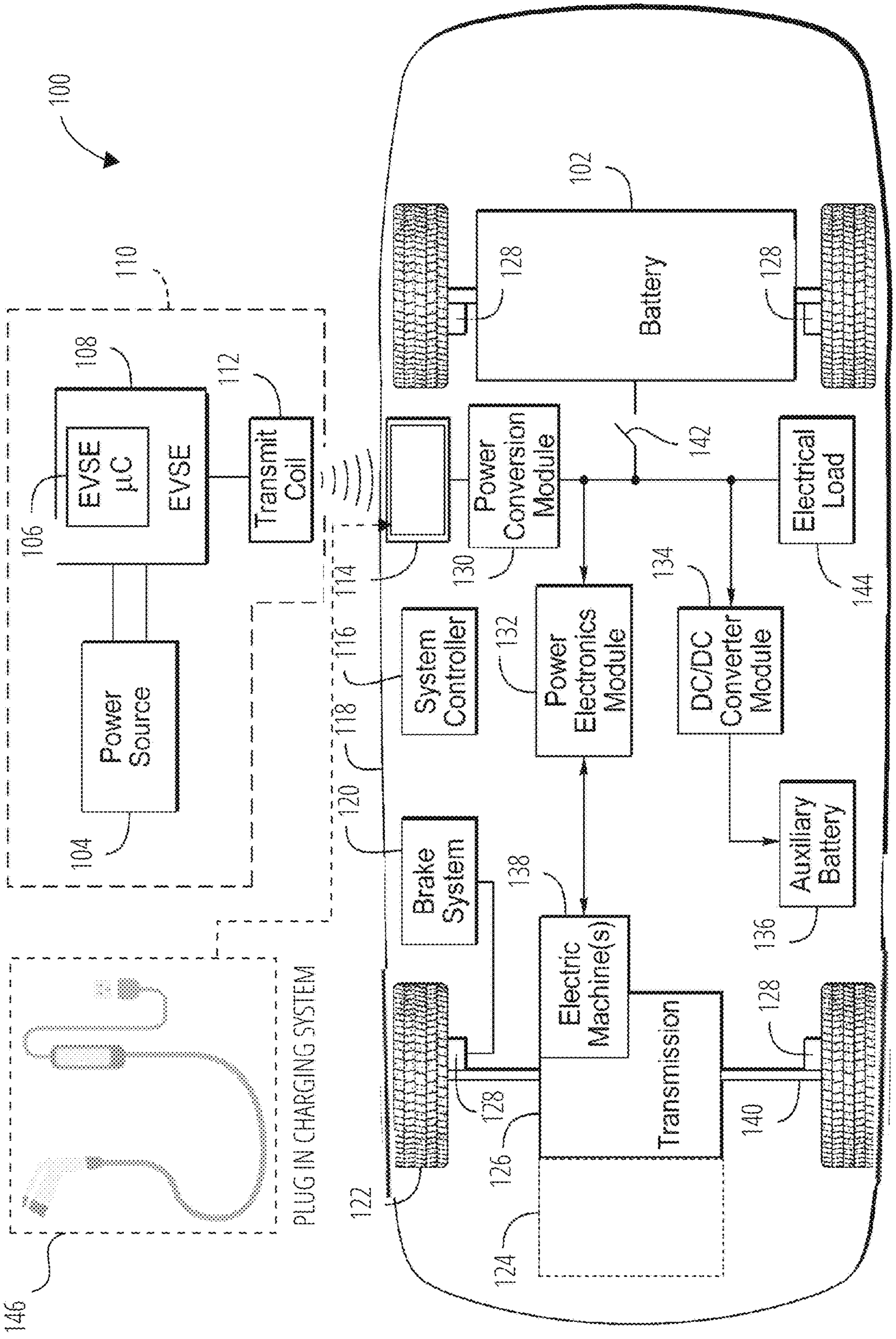
FIG. 1 depicts a drivetrain and energy storage components in accordance with an illustrative embodiment.

The illustrative embodiments described herein are directed to battery pack assembly having a heater integrated voltage sense disposed above and thermally and electrically connected to a plurality of cells. In an illustrative embodiment, the heater integrated voltage sense is arranged to enable servicing of the heater or heater integrated voltage sense without a need to remove the cells.

One or more embodiments recognize that an existing problem in battery pack manufacturing is the need to protect battery cell(s) 204 from harsh operating environments including cold temperatures. The overall performance of all battery types deteriorates significantly at low temperatures due to the reduced electrochemical reaction rate and accelerated health degradation, such as lithium plating in Lithium-Ion batteries. Temperature greatly affects chemical reactions. As temperature increases, molecules move faster and possess more kinetic energy. When molecules collide, the kinetic energy of the molecules can break bonds, leading to chemical reactions. If, however, the molecules are cold and moving slowly chemical reaction do not occur as fast. The minimum energy requirement that must be met for a chemical reaction to occur is called the activation energy. More molecules possess this energy in warmer temperatures. The illustrative embodiments recognize that without timely and effective actions, performance degradation causes operational difficulties and safety hazards for electric vehicles. Battery warm-up/preheating is of particular importance when operating electric vehicles in cold geographical regions. However, due to the conventional design of heaters and voltage sense circuits as two separate and unique entities, and the placement of heaters beneath battery cells in conventional battery packs, it is challenging, if not impossible, to service heaters, especially heaters of cell-to-pack battery configurations without removing and potentially damaging said battery cells. The illustrative embodiments further recognize that designing heaters and voltage sense circuits as separate entities is costly. Solving the problem posed by traditional systems is a particularly challenging one as merely placing heaters at any location can present safety problems.

One or more embodiments are thus directed to a battery pack assembly that comprises a heater integrated voltage sense 208, with said heater integrated voltage sense including a heater, and a voltage sense circuit affixed together. In an illustrative embodiment, the heater integrated voltage sense 208 also includes a heat spreader configured to transfer thermal energy away from the heater. In the embodiment, the voltage sense circuit may be affixed to a first portion of the heat spreader, with the heater being affixed to a second portion of the heat spreader. In an embodiment, the affixing may be achieved by adhering them together by adhesives such as Pressure Sensitive Adhesives(PSA), spray adhesive, thermal epoxy, etc. Alternatively they may be laminated together.

In a further embodiment, the heater integrated voltage sense 208 is disposed above a plurality of cells arranged in the battery pack assembly. The voltage sense circuit is electrically connected to the plurality of cells through one or more cell-connecting busbars, that are typically laser-welded to the cell terminals, in order to measure a terminal voltage of one or more cells of a plurality of cells. The heat spreader is thermally connected to one or more cells of the plurality of cells through said one or more busbars or through contact with the cells in order to heat said one or more cells of the plurality of cells.

Turning now to FIG. 1, a schematic of a generalized electric vehicle system 100 in which the battery pack assembly may be housed will be described. It will become apparent to a person skilled in the relevant art(s) that the concepts described herein are directed to all electrified vehicles, including, but not limited to, battery electric vehicles (BEV's), plug-in hybrid electric vehicles, motor vehicles, railed vehicles, watercraft, and aircraft configured to utilize rechargeable electric batteries as their main source of energy to power their drive systems propulsion or that possess an all-electric drivetrain.

The electric vehicle 118 may comprise one or more electric machines 138 mechanically connected to a transmission 126. The electric machines 138 may be capable of operating as a motor or a generator. In addition, the transmission 126 may be mechanically connected to an engine 124, as in a PHEV. The transmission 126 is also mechanically connected to a drive shaft 140 that is mechanically connected to the wheels 120. The electric machines 138 can provide propulsion and deceleration capability when the engine 124 is turned on or off. The electric machines 138 also act as generators and can provide fuel economy benefits by recovering energy that would normally be lost as heat in the friction braking system. The electric machines 138 may also reduce vehicle emissions by allowing the engine 124 to operate at more efficient speeds and allowing the electric vehicle 118 to be operated in electric mode with the engine 124 off in the case of hybrid electric vehicles.

A battery pack assembly 102 stores energy that can be used by the electric machines 138. The battery pack assembly 102 typically provides a high voltage DC output and is electrically connected to one or more power electronics modules 132. In some embodiments, the battery pack assembly 102 comprises a traction battery and a range-extender battery. One or more contactors 142 may isolate the battery pack assembly 102 from other components when opened and connect the battery pack assembly 102 to other components when closed. To increase the energy densities available for electric vehicles, an arrangement of cells that eliminates unnecessary hardware and makes of extra space may be adapted as described hereinafter. For example, a battery pack configuration may include cells directly placed in an enclosure without the use of separate modules (i.e. in a cell-to-pack configuration) with the enclosure also housing other hardware such as, but not limited to the power electronics module 132, DC/DC converter module 134, system controller 116 (such as a battery management system (BMS)), power conversion module 130, battery thermal management system (cooling system and electric heaters) and contactors 142. This consolidated arrangement allows space otherwise occupied separately by said other hardware to be made available for more cells in the battery pack, thus increasing the battery volumetric energy density. The power electronics module 132 is also electrically connected to the electric machines 138 and provides the ability to bi-directionally transfer energy between the battery pack assembly 102 and the electric machines 138. For example, a traction or range-extender battery may provide a DC voltage while the electric machines 138 may operate using a three-phase AC current. The power electronics module 132 may convert the DC voltage to a three-phase AC current for use by the electric machines 138. In a regenerative mode, the power electronics module 132 may convert the three-phase AC current from the electric machines 138 acting as generators to the DC voltage compatible with the battery pack assembly 102. The description herein is equally applicable to a BEV. For a BEV, the transmission 126 may be a gear box connected to an electric machine 14 and the engine 124 may not be present.

In addition to providing energy for propulsion, the battery pack assembly 102 may provide energy for other vehicle electrical systems. A typical system may include a DC/DC converter module 134 that converts the high voltage DC output of the battery pack assembly 102 to a low voltage DC supply that is compatible with other vehicle loads. Other electrical loads 144, such as compressors and electric heaters, may be connected directly to the high voltage without the use of a DC/DC converter module 134. The low-voltage systems may be electrically connected to an auxiliary battery 136 (e.g., 116V battery). The illustrative embodiments recognize that due to the numerous components that make up the drivetrain of the electric vehicle, and exposure to extreme temperature conditions, it is imperative to make judicious disposition of the assembly components in order to efficiently control temperature and maximize electrochemical reaction rate to reduce health degradation thereby preventing or substantially reducing operational difficulties and safety hazards for electric vehicles and making them easily serviceable. Positioning the heater in a serviceable location in a cell-to-pack configuration, and in an integrated fashion as described herein allows the heat spreader to not only even out temperatures in cells during heating but also to dissipate heat in busbars during charge/discharge, while simplifying the assembling of the battery pack.

The battery pack assembly 102 may be recharged by a charging system such as a wireless vehicle charging system 110 or a plug-in charging system 146. The wireless vehicle charging system 110 may include an external power source 104. The external power source 104 may be a connection to an electrical outlet. The external power source 104 may be electrically connected to electric vehicle supply equipment 108 (EVSE). The electric vehicle supply equipment 108 may provide an EVSE controller 106 to provide circuitry and controls to regulate and manage the transfer of energy between the external power source 104 and the electric vehicle 118. The external power source 104 may provide DC or AC electric power to the electric vehicle supply equipment 108. The electric vehicle supply equipment 108 may be coupled to a transmit coil 112 for wirelessly transferring energy to a receiver 114 of the vehicle 118 (which in the case of a wireless vehicle charging system 110 is a receive coil). The receiver 114 may be electrically connected to a charger or on-board power conversion module 136. The receiver 114 may be located on an underside of the electric vehicle 118. In the case of a plug-in charging system 146, the receiver 114 may be a plug-in receiver/charge port and may be configured to charge the battery pack assembly 102 upon insertion of a plug-in charger. The power conversion module 130 may condition the power supplied to the receiver 114 to provide the proper voltage and current levels to the battery pack assembly 102. The power conversion module 130 may interface with the electric vehicle supply equipment 108 to coordinate the delivery of power to the electric vehicle 118.

One or more wheel brakes 128 may be provided for decelerating the electric vehicle 118 and preventing motion of the electric vehicle 118. The wheel brakes 128 may be hydraulically actuated, electrically actuated, or some combination thereof. The wheel brakes 128 may be a part of a brake system 120. The brake system 120 may include other components to operate the wheel brakes 128. For simplicity, the figure depicts a single connection between the brake system 120 and one of the wheel brakes 128. A connection between the brake system 120 and the other wheel brakes 126 is implied. The brake system 120 may include a controller to monitor and coordinate the brake system 120. The brake system 120 may monitor the brake components and control the wheel brakes 128 for vehicle deceleration. The brake system 120 may respond to driver commands and may also operate autonomously to implement features such as stability control. The controller of the brake system 120 may implement a method of applying a requested brake force when requested by another controller or sub-function.

One or more electrical loads 144 may be connected to the high-voltage bus. The electrical loads 144 may have an associated controller that operates and controls the electrical loads 144 when appropriate. Examples of electrical loads 144 may be a heating module or an air-conditioning module.

Figure 2:
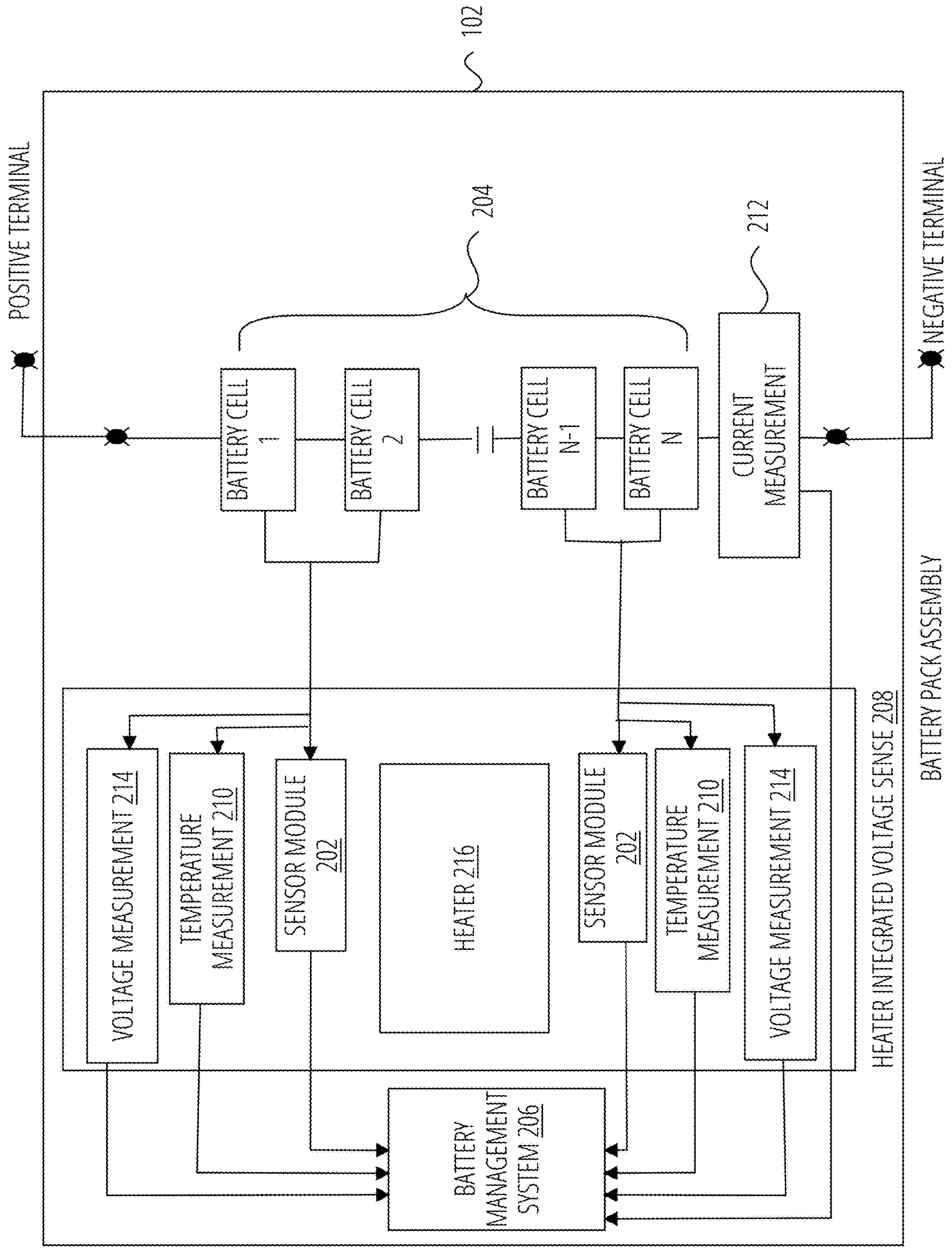
FIG. 2 depicts a system diagram of a battery pack assembly in accordance with an illustrative embodiment.

A battery pack assembly such as the battery pack assembly 102 of FIG. 1 may be constructed from a variety of chemical formulations, including, for example, lead acid, nickel-metal hydride (NIMH), Lithium-Ion, a Gr(Graphite) or Gr+SS (Graphite+Solid State) chemistry. FIG. 2 shows a schematic of the battery pack assembly 102 in a simple series configuration of N battery cell(s) 204. Other battery pack assembly 102, however, may be composed of any number of individual battery cells connected in series or parallel or some combination thereof. The battery pack assembly 102 may have a one or more controllers, such as a Battery Management System (BMS 206) that monitors and controls the performance of the battery pack assembly 102. The BMS 206 may monitor several battery pack level characteristics such as current 212, voltage 214 and temperature 210. The BMS 206 may have non-volatile memory such that data may be retained when the BMS 206 is in an off condition. Retained data may be available upon the next key cycle. To maximize the number of battery cell(s) 204 in the battery pack assembly 102, electronics of the battery pack assembly 102 including the BMS 206 may be arranged in an electronics compartment.

In addition to the pack level characteristics, there may be battery cell(s) 204 level characteristics that are measured and monitored. For example, the terminal voltage, current, and temperature of each battery cell(s) 204 may be measured using a voltage sense circuit of a heater integrated voltage sense 208. A system may use a sensor module(s) 202 to measure the battery cell(s) 204 characteristics. Measurements of temperature 210 and voltage 214 may be incorporated in the sensor module(s) 202 in some embodiments.

Figure 3A:
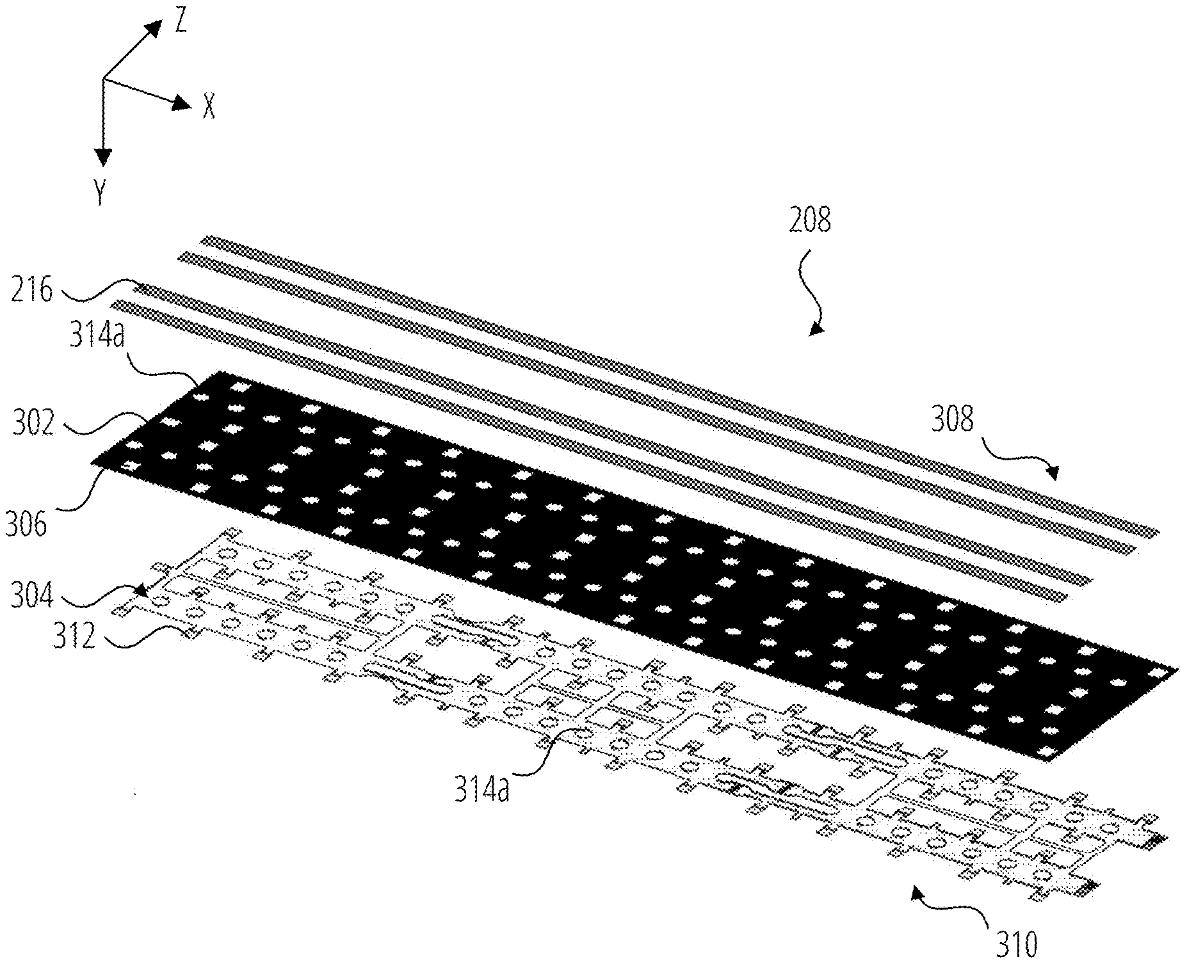
FIG. 3A depicts an exploded view of a heater integrated voltage sense in accordance with an illustrative embodiment.

In an illustrative embodiment, measurements of the voltage 214 and/or temperature 210 are done by a voltage sense circuit 304 (shown in FIG. 3A). The voltage sense circuit 304 carries minimal to no current so that there is minimal voltage drop in the circuit. The voltage sense circuit 304 senses the voltage of the battery cell(s) 204 and applies a voltage sense signal to the BMS 206. The voltage sense circuit 304 may measure the voltage of each battery cell 204 and/or of the pack of cells, for cell balancing and state of charge purposes. For example, by connecting the leads 312 of the voltage sense circuit 304 to each battery cell, voltages of each cell can be measured. Thus, each cell is provided with a cell voltage sensor for measuring its output voltage. In an illustrative embodiment, each cell or the pack as a whole may also be provided with a thermistor integrated into the voltage sense circuit 304 for measuring a temperature of said cell/pack.

Thus, in a charging step, after receiving a voltage sensing signal of the battery or cell, it can be determined whether the voltage meets a threshold charging requirement.

Depending on the capabilities, the sensor module(s) 202 may measure the characteristics of one or multiple of the battery cell(s) 204. Each sensor module(s) 202 may transfer the measurements to the BMS 206 for further processing and coordination. The sensor module(s) 202 may transfer signals in analog or digital form to the BMS 206. In some embodiments, the sensor module(s) 202 functionality may be incorporated internally to the BMS 206. That is, the sensor module(s) 202 hardware may be integrated as part of the circuitry in the BMS 206 and the BMS 206 may handle the processing of raw signals. Further, a heater may be incorporated into the battery pack assembly 102. Said heater is integrated into a voltage sense circuit to form the heater integrated voltage sense 208. By placing the heater integrated voltage sense 208 above the battery cell(s)s 204 or in a position of the battery pack assembly 102 that is easily accessible, the battery pack assembly 102 may become serviceable at all times.

It may also be useful to calculate various characteristics of the battery pack. Quantities such a battery power capability and battery state of charge may be useful for controlling the operation of the battery pack as well as any electrical loads receiving power from the battery pack. Battery power capability is a measure of the maximum amount of power the battery can provide or the maximum amount of power that the battery can receive for the next specified time period, for example, 1 second or less than one second. Knowing the battery power capability allows electrical loads to be managed such that the power requested is within limits that the battery can handle.

Battery pack state of charge (SOC) gives an indication of how much charge remains in the battery pack. The battery pack SOC may be output to inform the driver of how much charge remains in the battery pack, similar to a fuel gauge. The battery pack SOC may also be used to control the operation of an electric vehicle. Calculation of battery pack or cell SOC can be accomplished by a variety of methods. One possible method of calculating battery SOC is to perform an integration of the battery pack current over time. One possible disadvantage to this method is that the current measurement may be noisy. Possible inaccuracy in the state of charge may occur due to the integration of this noisy signal over time. Calculation of battery pack or cell SOC can also be accomplished by using an observer, whereas a battery model is used for construction of the observer, with measurements of battery current, terminal voltage, and temperature. Battery model parameters may be identified through recursive estimation based on such measurements. The battery management system estimates various battery parameters based on the sensor measurements.

Figure 3B:
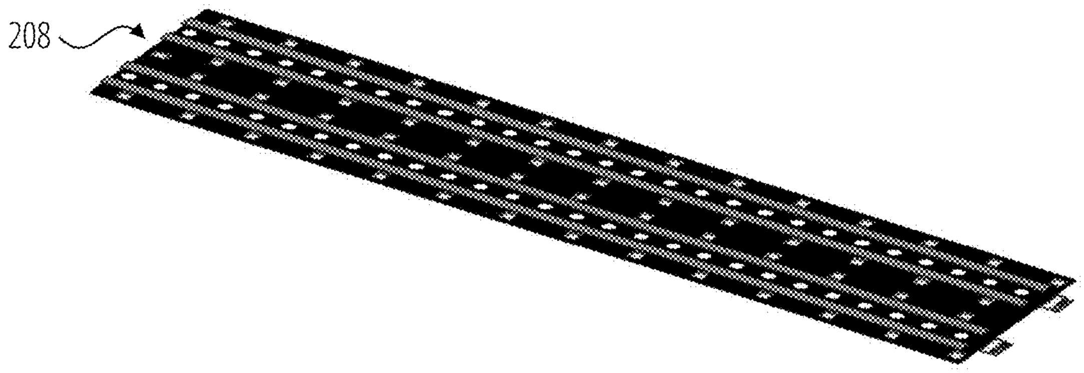
FIG. 3B depicts a perspective view a heater integrated voltage sense in accordance with an illustrative embodiment.
Figure 4:
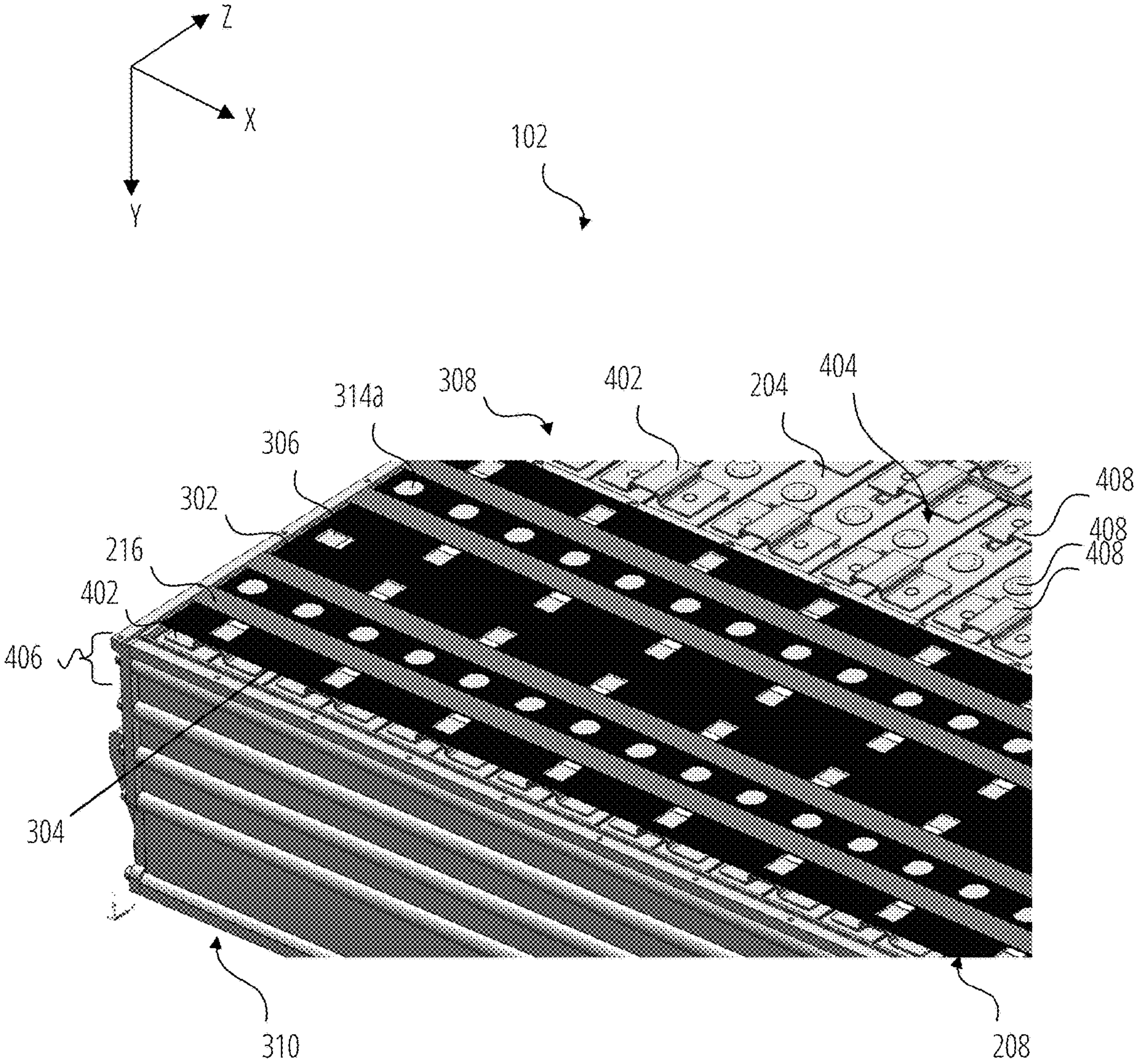
FIG. 4 depicts a perspective view of a battery pack assembly in accordance with an illustrative embodiment.

FIG. 3A illustrates an exploded view of an illustrative heater integrated voltage sense 208 which forms part of the battery pack assembly 102 of FIG. 4. A corresponding perspective view of the heater integrated voltage sense 208 is shown in FIG. 3B. The heater integrated voltage sense 208 comprises one or more heaters 216, a heat spreader 302 configured to transfer thermal energy away from the heater, and a voltage sense circuit affixed to a first portion of the heat spreader, with the heater being affixed to a second portion of the heat spreader. In one or more embodiments, the heater 216, the heat spreader 302 and a voltage sense circuit 304 (discussed hereinafter) are configured to be flexible to form a flexible heater integrated voltage sense 208, though this is not meant to be limiting. In another embodiment, the heat spreader 302 is a graphite heat spreader. Alternatively, the heat spreader 302 can be made of other materials such as conductors like copper, aluminum, or diamond.

A heat spreader has high thermal conductivity and can transfer energy as heat from a concentrated or high heat flux source to a colder heat sink or heat exchanger. By configuring the heat spreader to cover an area of a plurality of battery cell(s) 204 over which heating is needed, the rate at which thermal energy is dissipated from the heater 216 to said plurality of battery cell(s) 204 is increased. The heat spreader 302 may serve as the primary mechanism by which heat moves between the heater 216 and battery cell(s) 204. The heat spreader is configured to among other functions, reduce surface hot spots on the battery pack assembly, protect thermally sensitive components of the battery pack assembly from the heater, provide thermal gradient reduction between the heater and the cell volume.

To ensure rapid heating of the cells, the heat spreader 302 is configured to make contact with busbars 402 (FIG. 4) of the cells and/or to make contact with as much of the cell surface area as possible. Therefore, the heat spreader 302 is directly or indirectly thermally connected to a top portion 406 of the plurality of cells. This can be achieved by configuring a shape and geometry of the heat spreader 302 or of the heater integrated voltage sense 208 to be complementary to a shape and geometry of the top surface area 404 of the cells of the battery pack assembly 102 (not shown). However, the heat spreader 302 may alternatively have a flat shape with holes configured to receive projections 408 from the top surface area 404 of the cells to allow as much contact as possible between the cells or busbars and the heat spreader. In both cases, the heat spreader 302 and thus the heater 216 are configured to be thermally coupled to the battery cell(s) 204 through at least the busbars 402 or top surface area 404 of the battery cell(s). Each cell has a corresponding busbar 402 that enables thermal connection to the heater or heater heat spreader 302 as well as electrical connection to the voltage sense circuit 304 through leads 312 of the voltage sense circuit 304. Said busbars 402 are connected to positive and negative terminals of the cells 204, as shown in FIG. 4 to enable series or parallel connection of cells in a battery pack assembly as appropriate, i.e. the cells may be arranged in series or in parallel or both and the arrangement may be based on the manner in which the cell terminals are connected by the busbars.

Turning back to FIG. 3A, the heat spreader has a plurality of first holes 306 to provide clearance for affixing, such as welding, of the leads 312 of the voltage sense circuit 304 to the busbars 402 to enable said electrical connection. The first holes 306 may also receive the busbars center projections 408 to allow the heat spreader 302 to come into contact with the rest of the busbars. The heat spreader 302 may also have a plurality of second holes second holes 314*a* to provide clearance for cell ventilation. In an illustrative embodiment, the voltage sense circuit 304 is also provided with a plurality of second holes 314*a*, configured to be geometrically identical to the plurality of second hole 314*a* of the heat spreader 302. In the embodiment, said plurality of second holes 314*a* of the voltage sense circuit 304 have a corresponding number of second holes second hole 314*a* in the heat spreader 302 and are each disposed directly below (in the Y-direction starting from a top 308 of the battery pack assembly 102 as shown in FIG. 3A and FIG. 4) their corresponding second hole 314*a* of the heat spreader 302 in order to provide clearance for ventilation. Further, different shapes and locations of holes may be integrated into the heat spreader and/or the voltage sense circuit to provide clearance for attachments, ventilation, and heat transfer.

Efficient functioning of a battery pack heat transfer configuration relies on the rapid transfer of thermal energy from the heater to cells. By increasing the surface area of the busbars or cells, thermally coupled to the heat spreader, to become as large as possible (or at least to be larger than the surface area of the heater 216 that is in contact with the heat spreader 302 in some embodiments), heat from the heater is “spread out”, to substantially increase the rate of heat exchange between the heater and the cells, relative to that of conventional battery pack assemblies which tend to have the heater disposed at a bottom 310 of the assembly and without an integrated heat spreader. Thus, the heater 216 can approach thermal equilibrium with the cells 204 faster. The heat spreader has very high in plane thermal conductivity which allows it to spread heat from a small source over a large surface area efficiently. The higher the area of contact to the cell or bus bar the lower the thermal resistance will be. This will result in greater efficiency in moving the heat from the heater into the cells Placing a heater at the bottom of battery pack assemblies as is the case with conventional battery pack assemblies slows down the heating of battery cells due to, for example, the close proximity of ambient air outside the vehicle to the heater at the bottom of the vehicle. By placing the heater at a top portion of the battery pack assembly and integrating said heater with the voltage sense circuit 304, rapid and even or substantially even heating can be ensured and the heater is made more easily accessible but to the added ability to reach the heater without removing the battery cells.

As shown in FIG. 4 a plurality of battery cell(s) 204 are arranged in the battery pack assembly below (in the Y-direction starting from a top 308 of the battery pack assembly 102 as shown in FIG. 4) the heater integrated voltage sense 208. The voltage sense circuit 304 is electrically connected to the plurality of cells through one or more busbars and is configured to measure a terminal voltage of one or more cells of the plurality of cells. As explained, the heat spreader is thermally connected to one or more cells of the plurality of cells through said one or more busbars in order to heat said one or more cells of the plurality of cells.

Of course, the example configurations described herein are used only for the clarity of the description and are not meant to be limiting, as other configurations can be obtained in light of this specification. For example, while one or more embodiment may have a heat spreader, one or more other embodiments may integrate a heater into a voltage sense circuit without the use of a heat spreader. In said one or more other embodiments, the heater is thermally coupled directly to the cells and disposed below (in the Y-direction starting from a top 308 of the battery pack assembly 102) the voltage sense circuit 304. In another embodiment, the heater integrated voltage sense 208 includes the heat spreader 302 and the voltage sense circuit 304 and the heater 216 are disposed on a same side of the heat spreader 302.

Figure 5:
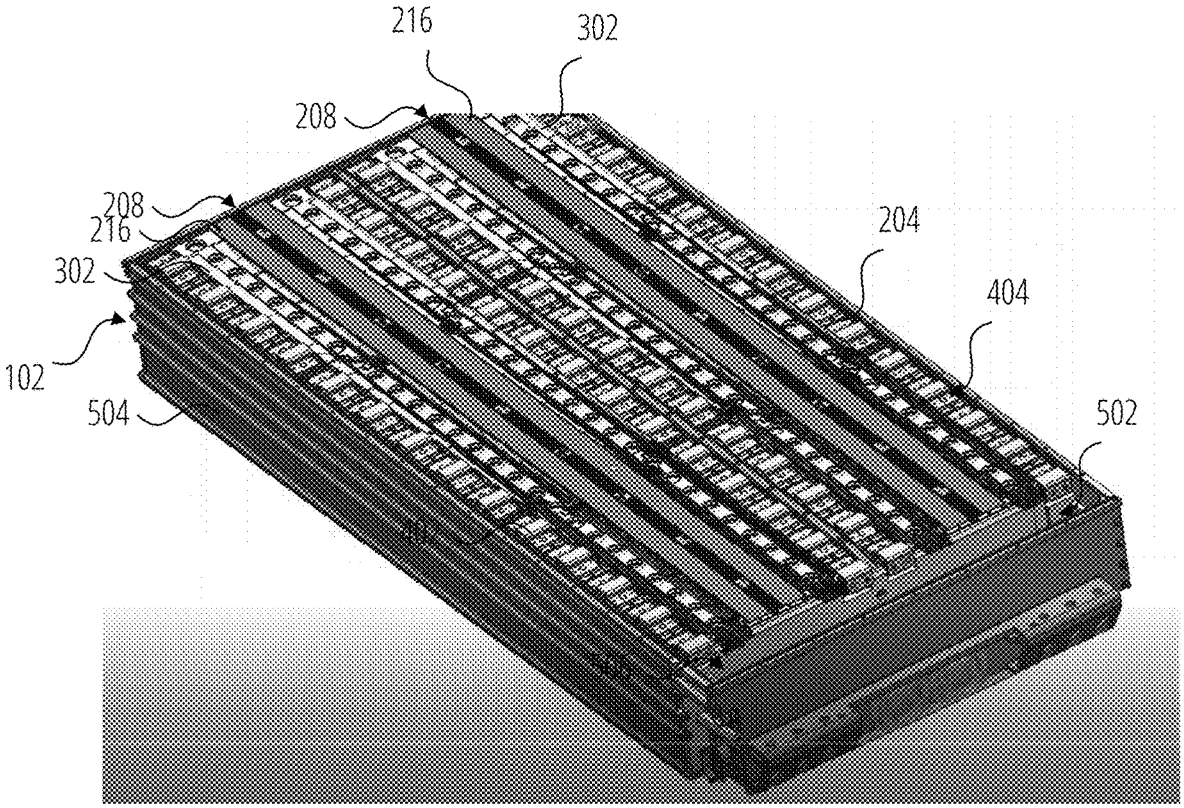
FIG. 5 depicts a perspective view of a battery pack assembly having a cell-to-pack configuration in accordance with an illustrative embodiment.

FIG. 5 illustrates a perspective view of a battery pack assembly 102 having two separate heater integrated voltage senses 208 according to an illustrative embodiment. In the embodiment, the top surface area 404 is partially covered with the two heater integrated voltage senses 208, though in other embodiments, the top surface area 404 may be covered using more than two heater integrated voltage senses 208 such that the top surface area 404 is substantially (e.g. 90% or more) covered. Further a geometry and size of a single heater integrated voltage sense 208 may be configured to substantially cover the top surface area 404. The battery pack assembly 102 of FIG. 5 is configured with a cell-to-pack configuration 502 wherein the battery cell(s) 204 are arranged directly inside sidewalls 504 without the use of conventional battery pack modules. To electrically communicate with the battery cell(s) 204, the battery management system (BMS) is disposed in an electronic compartment 506 that is spatially separated from the rest of the assembly that houses the cells, and the voltage sense circuit 304 of the heater integrated voltage sense 208 is electrically coupled with the BMS. The voltage sense circuit 304 may also comprise one or more temperature sensors or thermistors (temperature measurement 210) configured to measure surrounding temperature, though said temperature sensors can also be separate from the voltage sense circuit 304. The thermistor is a resistor that is sensitive to temperature change. As surrounding temperature changes, the resistance of the thermistor changes. By integrating the thermistor in the voltage sense circuit 304, the resistance can be measured to determine the temperature of the thermistor's environment. The voltage sense circuit 304 also has one or more fuses to prevent shorting across cells.

In an illustrative embodiment, the heat spreader 302 comprises a graphite heat spreader. Graphite is either natural or synthetic and is composed of hundreds of thousands of graphene layers, stacked on top of each other. Said graphene layers provide optimal thermal, electrical, and acoustic spreading (compared to conventional heat spreaders such as aluminum heat spreaders) in the plane of the material while providing reduced spreading through the thickness of the material. This results in anisotropic (i.e. having a physical property that has a different value when measured in different directions) heat spreading in the plane approximately 100 to 450 times more than through the plane.

A graphite heat spreader provides the advantage of being lighter than aluminum and copper and providing thermal management solutions in limited spaces by being die-cuttable into customizable shapes. Further, the graphite heat spreader may be configured to be flexible and to have adhesive applied to it to enable peel and stick attachment of the heater and/or voltage sense circuit 304. The flexible graphite heat spreader may also comprise a natural flexible natural graphite heat spreader. Flexible natural graphite heat spreaders have a thermal conductivity of up to three times that of aluminum, while only weighing a third as much for equivalent heat spreading.

In another illustrative embodiment, the heater 216 is also a flexible heater. The flexible heater is in one example, a single layer flexible circuit that employs resistive alloys, such as copper-nickel, rather than copper to form conductive paths. As electrical current is driven through the high resistance conductors, heat is generated. Path width and thickness can thus be configured to provide a desired resistance value based on the voltage supplied to the heater. The flexible heater can thus offer rapid heat transfer in a low profile and low mass package compared to conventional heaters. Due to the flexibility, said flexible heater, along with a flexible heat spreader can conform to, and heat, irregular surfaces of the cells or busbars that other types of heaters cannot. Another example of a flexible heater is wire woven through fabric material, similar to that of a seat heater.

Figure 6:
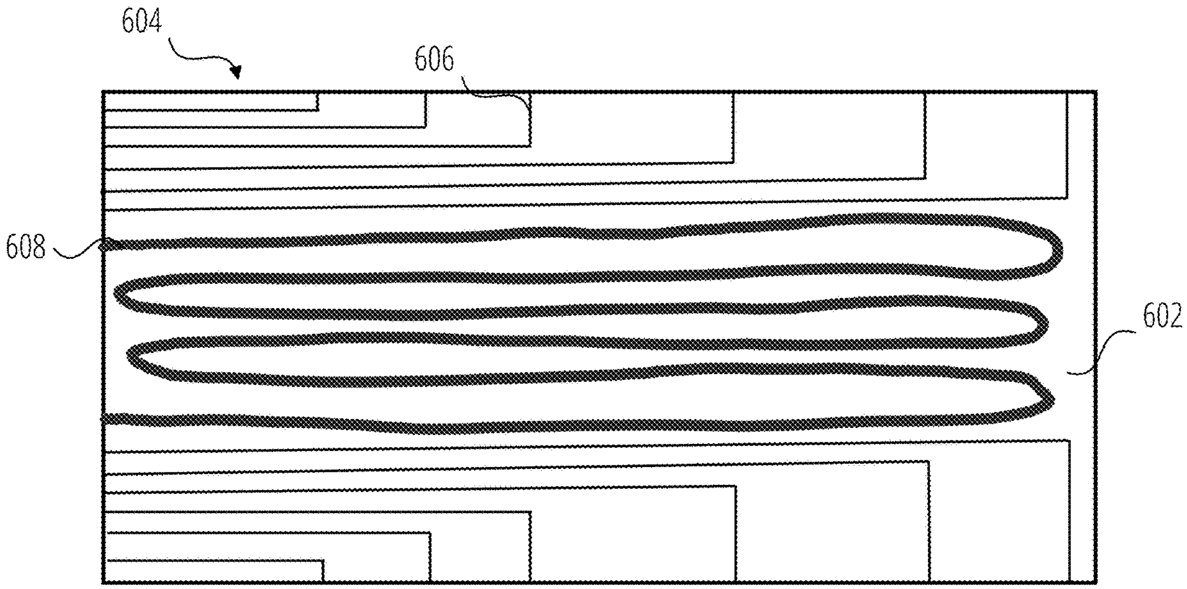
FIG. 6 depicts a top view of a flexible heater integrated voltage sense circuit having a voltage sense circuit and a heater on a same side of a base material in accordance with an illustrative embodiment.

Turning now to FIG. 6, a microfabricated heater integrated voltage sense 604 is microfabricated (fabricated at a high dimensional scale/accuracy in the range of, for example, micrometers to millimeters or less) by, for example, an etching process to chemically remove layers from the surface of a wafer is shown. In an illustrative embodiment, the microfabricated heater integrated voltage sense 604 of FIG. 6 does not include a heat spreader 302, whereas in another illustrative embodiment, the microfabricated heater integrated voltage sense 604 of FIG. 6 includes a heat spreader 302 and thus has multiple layers. Different etching procedures for integrated circuit manufacturing such as wet etching, anisotropic wet etching, plasma etching etc. are possible and are contemplated by the descriptions herein. The microfabricated heater integrated voltage sense 604 has the snake-shaped heater comprising a heater trace 608 disposed in a middle section and a voltage sense circuit trace 606 disposed on edges of the microfabricated heater integrated voltage sense 604. Herein the heater circuit is integrated into the same flexible circuit as the voltage sense circuit. The snake-shape increases a contact surface area for the heater, though other shapes or sizes are contemplated. The heater trace 608 and voltage sense circuit trace 606 are formed on the same side or on opposite sides of a base electrically insulating material 602 such as polyamide by etching. The material chosen for the heater trace 608 can be the same or different from the material chosen for the voltage sense circuit trace 606 depending on thermal and electrical coupling requirements of the microfabricated heater integrated voltage sense 604. In an example, the trace material is copper. A creepage distance (i.e. the shortest distance along the surface of the base material 602 between two conductive parts) is configured to prevent cross talk between conductive parts of the microfabricated heater integrated voltage sense 604. Thus, the heater circuit is integrated into the same flex circuit as the voltage sense, the heat spreader is eliminated and the heater is thermally connected to the top of the cells and the voltage sense circuit is electrically connected to the busbars.

In yet another illustrative embodiment, the battery pack assembly 102 has a thermal barrier (not shown) disposed on top of the heater 216 to substantially reduce (e.g. by 90% or more) heat loss at the top surface area 404 to ambient air. Thus, heat produced by the heater 216 is substantially transferred downwards (in the Y-direction starting from a top 308 of the battery pack assembly 102 as shown in FIG. 4) to the battery cell(s) 204 for preheating.

Figure 7:
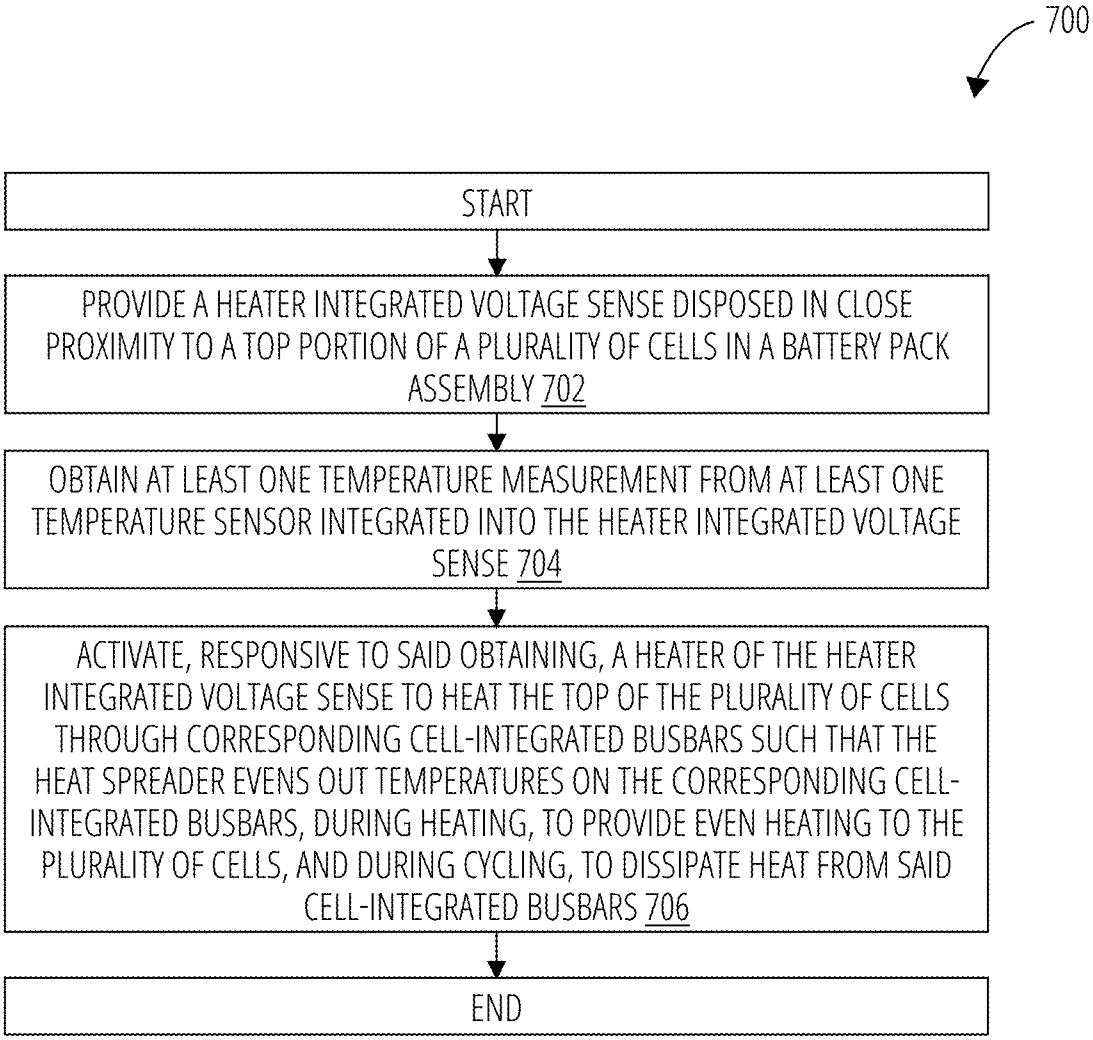
FIG. 7 depicts a process in accordance with an illustrative embodiment.

Turning now to FIG. 7, a method 700 for thermal management of cells of the battery pack assembly is disclosed. In step 702, the method 700 provides a heater integrated voltage sense having a heater, a heat spreader, and a voltage sense circuit, and disposed in close proximity to a top portion 406 of a plurality of cells in a battery pack assembly. In step 704, method 700 obtains at least one temperature measurement from at least one thermistor or temperature sensor integrated into the heater integrated voltage sense. In step 706, method 700 activates, responsive to the obtaining the at least one temperature measurement, a heater of the heater integrated voltage sense to heat the top of the plurality of cells through corresponding cell-integrated busbars 402 such that the heat spreader evens out or substantially evens out temperatures on the corresponding cell-integrated busbars, during heating, to provide even or substantially even heating to the plurality of cells, and during cycling, to provide even or substantially even dissipation heat from the cell-integrated busbars. In an illustrative embodiment, the battery pack assembly includes a plurality of heaters and the method activates each heaters based on temperature measurements of sensors proximal to the heater such that the cells of the battery pack assembly are heated evenly or substantially evenly.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A battery pack assembly comprising:

a heater integrated voltage sense including:

a heater;

a heat spreader affixed to the heater and configured to transfer thermal energy away from the heater; and a voltage sense circuit affixed to the heat spreader; and a plurality of cells arranged in the battery pack assembly below the heater integrated voltage sense;

wherein the voltage sense circuit is electrically connected to the plurality of cells through one or more busbars, and configured to measure a terminal voltage of one or more cells of the plurality of cells; and wherein the heat spreader is thermally connected to the one or more cells of the plurality of cells through said one or more busbars or through contact with a top portion of the one or more cells.

2. The battery pack assembly of claim 1, wherein the heat spreader comprises a graphite heat spreader.

3. The battery pack assembly of claim 1, wherein the voltage sense circuit and the heater are on a same side of the heat spreader.

4. The battery pack assembly of claim 1, wherein the voltage sense circuit and the heater are on opposite sides of the heat spreader.

5. The battery pack assembly of claim 1, wherein the voltage sense circuit is a flexible circuit.

6. The battery pack assembly of claim 1, wherein the heater is a flexible circuit heater.

7. The battery pack assembly of claim 1, wherein the voltage sense circuit comprises one or more thermistors.

8. The battery pack assembly of claim 1, further comprising a thermal barrier disposed on a top of the heater to substantially reduce heat loss to ambient air.

9. The battery pack assembly of claim 1, wherein the heat spreader comprises a plurality of holes configured to provide clearance for affixing the voltage sense circuit to the busbars or to provide cell vent clearance.

10. The battery pack assembly of claim 1, wherein the battery pack assembly has a cell-to-pack configuration.

11. The battery pack assembly of claim 1, wherein the heater is mounted in a location of the battery pack assembly that allows the heater to be serviced without a need to remove any cell of the plurality of cells.

12. The battery pack assembly of claim 1, wherein the heater integrated voltage sense is configured to dissipate thermal energy away from the one or more busbars during charging or discharging of the plurality of cells.

13. The battery pack assembly of claim 1, wherein the heater integrated voltage sense is configured to heat the plurality of cells evenly or substantially evenly.

14. The battery pack assembly of claim 1, wherein the heater is removably affixed to the heat spreader.

15. The battery pack assembly of claim 14, wherein the heater is replaceable with another heater separately from the heat spreader.

16. The battery pack assembly of claim 1, wherein the heater integrated voltage sense comprises a plurality of heaters.

17. The battery pack assembly of claim 1, wherein the heater is made from a material selected from the group consisting of copper, aluminum, copper-nickel, and nickel chromium.

* * * * *